US010009576B2

(12) United States Patent
Zhong et al.

(10) Patent No.: US 10,009,576 B2
(45) Date of Patent: Jun. 26, 2018

(54) AUDIO AND VIDEO CONVERSION DEVICE

(71) Applicant: Amlogic (Shanghai) Co., Ltd., Pudong, Shanghai (CN)

(72) Inventors: John Zhong, Shanghai (CN); Mike Yip, Shanghai (CN); Kevin Chen, Shanghai (CN); Robin Zhu, Shanghai (CN)

(73) Assignee: Amlogic (Shanghai) Co., Ltd., Pudong, Shangai (CN)

( * ) Notice: Subject to any disclaimer, the term of this patent is extended or adjusted under 35 U.S.C. 154(b) by 0 days. days.

(21) Appl. No.: 15/321,355

(22) PCT Filed: Oct. 27, 2015

(86) PCT No.: PCT/CN2015/092894
§ 371 (c)(1),
(2) Date: Dec. 22, 2016

(87) PCT Pub. No.: WO2016/070733
PCT Pub. Date: May 12, 2016

(65) Prior Publication Data
US 2017/0244929 A1    Aug. 24, 2017

Related U.S. Application Data

(60) Provisional application No. 62/077,236, filed on Nov. 8, 2014.

(30) Foreign Application Priority Data

Mar. 25, 2015    (CN) .......................... 2015 1 0134240

(51) Int. Cl.
*H04N 7/173*    (2011.01)
*H04N 7/01*    (2006.01)

(52) U.S. Cl.
CPC ................................ *H04N 7/0125* (2013.01)

(58) Field of Classification Search
CPC ..................................................... H04N 7/0125
See application file for complete search history.

(56) References Cited

U.S. PATENT DOCUMENTS 5,649,283 A * 7/1997 Galler ................ H04N 7/17318
348/460
8,010,644 B1 * 8/2011 Zang .................. G06Q 30/0206
705/400

(Continued)

FOREIGN PATENT DOCUMENTS

| CN | 101212583 A | 7/2008 |
|---|---|---|
| CN | 102883199 A | 1/2013 |
| CN | 202998355 U | 6/2013 |

*Primary Examiner* — Oleg Asanbayev
(74) *Attorney, Agent, or Firm* — McKee, Voorhees & Sease, PLC

(57) ABSTRACT

The invention provides an audio-video conversion device, relating to the field of TV, through converting the LVDS and/or V-by-One input port in the display into an HDMI port to make the display match the widely used HDMI audio-video processing device, so as to improve the flexibility of its adaptation; meanwhile, because the audio-video conversion device directly convert the TV signal in HDMI format into TV signal in LVDS and/or V-by-One format and then send it to the play device for playing, therefore there is no need to provide traditional LVDS chip and/or V-by-One chip on the display panel, and supports relatively high frequency to match frequency division and the frequency conversion of the screen, and then achieve the best image quality.

7 Claims, 3 Drawing Sheets

(56) References Cited

U.S. PATENT DOCUMENTS

| | | | | |
|---|---|---|---|---|
| 2005/0102699 | A1* | 5/2005 | Kim | G08C 17/00 725/81 |
| 2005/0120128 | A1* | 6/2005 | Willes | H04N 21/00 709/232 |
| 2007/0178863 | A1* | 8/2007 | Tuttle | H03J 1/0008 455/142 |
| 2007/0200961 | A1* | 8/2007 | Ohara | H04N 5/44504 348/790 |
| 2008/0127277 | A1* | 5/2008 | Kuschak | H04H 60/80 725/74 |
| 2008/0143551 | A1* | 6/2008 | Otsuka | G08C 17/02 340/12.25 |
| 2009/0067625 | A1* | 3/2009 | Patel | H04L 9/0656 380/201 |
| 2011/0202195 | A1* | 8/2011 | Finch | G06Q 10/06 700/295 |
| 2014/0198884 | A1* | 7/2014 | Yao | H04L 27/0014 375/344 |

\* cited by examiner

AUDIO AND VIDEO CONVERSION DEVICE

CROSS-REFERENCE TO RELATED APPLICATIONS

The present application claims priority to and the benefit of Chinese Patent Application No. CN 201510134240.5, filed on Mar. 25, 2015, and of US Provisional Patent Application No. 62/007,236, filed on Nov. 8, 2014, the entire content of which is incorporated herein by reference.

BACKGROUND OF THE INVENTION

1. Field of the Invention

The invention relates to the field of TV, more particularly, to an audio-video conversion device.

2. Description of the Related Art

In the modern society, TV set as an important audio-visual information source, with the advancing technology, especially with the rapid development of Internet technology, TV set has become the core device of intelligent home, and attracts more and more attention.

Currently, the TV sets on the market are all-in-one machines, i.e. the screen used for display and the main module used for controlling are all set as a whole in design, to product and sale; however, due to the life time of a TV set is long (at least 4-5 years, even 10 years), yet the update speed of the main module is rapid, and the display panel updates slowly relatively, which results that the updates of each part of the TV set don't match, which makes users have to buy a complete machine when upgrading, thereby increasing user's upgrade costs and hindering the development process of the main module of TV set.

In addition, with the progress of science and technology, more and more functions can be integrated and implemented on TV set, and then it presents a diversified development trend; more companies integrates more functional modules on their TV sets, so as to meet the needs of different users; while since the needs of the users are being more individualized, it is impossible for the companies to meet the needs of each user, and many relatively useless functions on the TV sets are brought to the users and creating waste of resources.

Furthermore, TV sets which can play TV signal in LVDS or V-By-One format all need to adapt and support LVDS or V-By-One TV chips, thereafter makes the production costs too high and the TV sets can not be compatible to the HDMI audio-video processing equipment which applied widely.

SUMMARY OF THE INVENTION

Aimed at the above-mentioned problems existing in the prior art, this invention provides an audio-video conversion device, which can be applied to a TV set which the main control block and the display are separately set, and the audio-video conversion device comprising:

an audio-video input unit, configured to receive a TV signal in HDMI format, a core and fabric module, connected to the audio-video input unit to receive the TV signal and convert the TV signal into LVDS format and/or V-by-One format, an audio-video output unit, connected to the core and fabric module and a playing device of the TV respectively to receive and send the TV signal in LVDS format and/or the V-by-One format to the playing device for playing.

Preferably, the audio-video conversion device, wherein the core and fabric module comprises a processor and a converter, and the processor control the converter to receive and convert the format of the TV signal into LVDS format and/or V-by-One format for outputting.

Preferably, the audio-video conversion device wherein, TV signal comprises audio data and video data, and the converter comprising:

a video processing unit, configured to receive the video signal in the TV signal in HDMI format, and after enhancing and correcting image of the video signal, converting the signal into a video signal in LVDS format and/or V-by-One format for outputting, an audio processing unit, configured to receive the audio signal in the TV signal in HDMI format, and convert the audio signal, so as to match the audio signal after conversion of the output video signal in LVDS format and/or V-by-One format.

Preferably, the audio-video conversion device wherein, the video processing unit comprises image producer, OSD functional unit, an a DNLP functional unit, a white balance functional unit, a hue-saturation adjustment functional unit and a brightness adjustment functional unit.

Preferably, the audio-video conversion device further comprising:

LVDS emitter, configured to send the TV signal in LVDS format, and/or

V-by-One emitter, configured to send the TV signal in V-by-One format.

Preferably, the audio-video conversion device further comprising:

a storage unit, connected to the core and fabric module through a set system interface, to keep the core and fabric module operating.

Preferably, the audio-video conversion device further comprising:

a remote IR receiver, connected to the core and fabric module to receive a control instruction sent by a controller of the TV set.

an on-chip oscillator, connected to the core and fabric module to provide clock signal to the core and fabric module.

Preferably, the audio-video conversion device further comprising:

an input/output port, connected to the audio-video input unit and the audio-video output unit respectively, and configured to receive the TV signal in HDMI format, and output the TV signal in LVDS format and/or the V-by-One format to the playing device for playing.

Preferably, the audio-video conversion device further comprising: the playing device comprises a sound and a display panel.

Preferably, the audio-video conversion device wherein:

the input/output port comprises a remote IR receiving subport, an embedded SARADC subport, a 12C subport, a UART subport, a PWM subport and a group of universal I/O port.

The above technical scheme has the following advantages or beneficial effects:

In this application, the technical scheme is to convert the LVDS and/or V-by-One input port into an HDMI port, so as to make the display panel able to be applied to the HDMI audio-video processing devices that are popular used in the world currently, and then increase the flexibility of adaptation; meanwhile, due to the audio-video conversion device directly convert the TV signal in HDMI format to the TV signal LVDS and/or V-by-One format, then send the TV signal in LVDS and/or V-by-One format to the playing device for playing; therefore, no need to provide the traditional LVDS TV chip and/or V-by-One TV chip on TV set, and support high resolution to match frequency division and the frequency conversion of the screen, so as to achieve the best image quality.

BRIEF DESCRIPTIONS OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
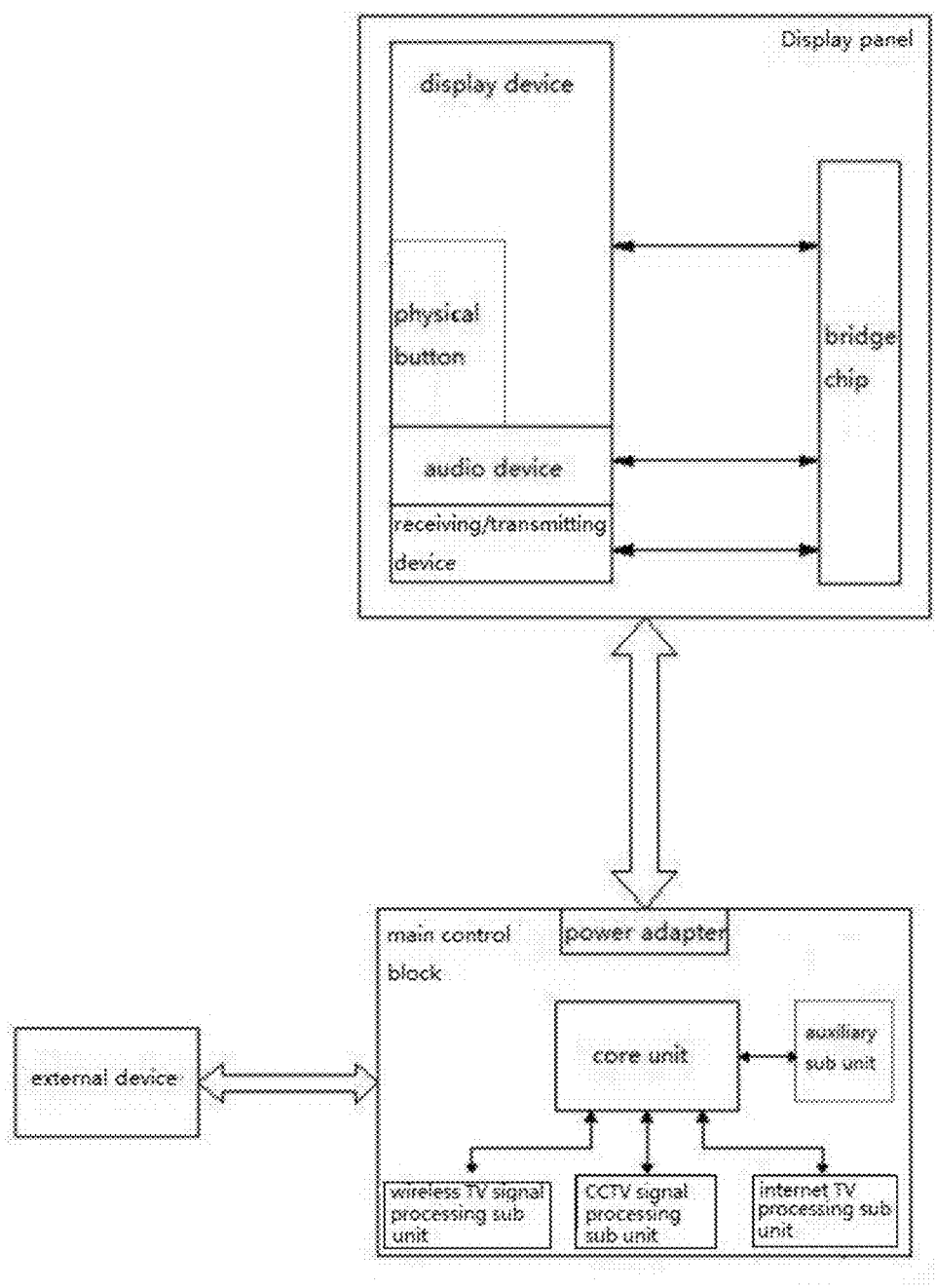
FIG. 1 is a structure diagram of the audio-video conversion device of embodiment 1 of this application.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

The TV sets provided in this invention are all based on the existing TV structure; through integrating the core components of the TV structure into a single independent main control block, and the independent main control block may be consist of the essential core and fabric module of TV set and at least one sub unit configured independently and having independent function, and the screen end components used to play audio and video then is integrated into another independent display panel; because the components of the display panel upgrades slowly, yet the components of the core and fabric module upgrades relatively quickly, for upgrading the kind of TV set, it only needs to independently upgrade the core and fabric module that needs to be upgraded and retain, for example, the screen end components and other components that don't need to be upgraded, so as to reduce the cost of upgrading TV set; and if a user buy a new TV set, according to his own individual requirements, a main control block with special functions can be formed through matching and assembling the sub unit having independent function and the above mentioned core and fabric module, so as to make the purchased TV set can meet the individual requirement.

The accompanying drawings, together with the specification, illustrate exemplary embodiment of the present disclosure, and, together with the description, serve to explain the principles of the audio-video conversion device.

Embodiment 1

FIG. 1 is a structure diagram of the audio-video conversion device in this embodiment; as FIG. 1 shown, the audio-video conversion device comprising:

a main control block, assembled mainly of the core components of TV, such as the output device (such as HDMI/CVBS and so on) which is relevant to broadcast content, the main control chip which saves on-line video data, application data and game data and other relevant data; the main control block connects to the signal transmission equipment of the audio-video conversion device through the connection port arranged on the display panel, to receive the raw data (first data) transmitted by the signal transmission equipment, and generate playing data (second data) matching the display panel after processing the raw data.

Preferably, the main control block can be consist of the essential core unit consisting of such as the main chip etc., and at least one sub unit, and each sub unit all can independently perform the processing function of at least one types of format data (such as wireless TV data, CCTV (Closed Circuit Television), internet data etc.), and if the above mentioned audio-video conversion device is assembled any of the sub unit, each sub unit connects to the matching signal transmission device separately, to receive the raw data in corresponding format, and convert into unprocessed data in a standard format after the conversion and other processes of the raw data, to facilitate follow-up operating to the data by the core unit, so as to be converted and generate the playing data.

Preferably, any of the above mentioned sub unit all can individually create a main control block, that can perform properly, with the core unit, and achieve a receiving and playing of a TV signal through the display panel; of course, two sub units or multiple sub units can be combined to achieve receiving and playing of two or multiple types of TV signals simultaneously.

Preferably, the above mentioned sub units may comprise a wireless TV signal processing sub unit, a CCTV processing sub unit and an internet TV processing sub unit; the wireless TV signal processing sub unit is mainly used for receiving and processing the wireless TV signal sent through the method of wireless broadcast, and conversing the wireless TV signal to the standard format for later processing to it by the core unit; the wireless TV signal processing sub unit may receive and process the TV signal sent in wireless broadcast method, and accordingly, it needs to integrate with a receiving antenna, an audio-video conversion component and so on, and can independently receive, analysis and convert the wireless TV signal data; the CCTV signal processing sub unit is configured to receive and process the CCTV signal (such as digital TV signal, et al) sent in wired transmission method, and convert the CCTV format into the above mentioned standard format; the CCTV signal processing sub unit may receive and process TV signal in wired transmission method, and accordingly, it needs to integrate with a receiving device for CCTV signal, an audio-video conversion component and so on, and can independently receive/transmit, analysis and convert CCTV signal data; the internet TV signal processing sub unit is configured to receive and process the internet TV signal (such as internet audio-video data, game data, application data and so on) transmitted through internet method, and convert the internet TV format into the above mentioned standard format; the internet TV signal processing sub unit may comprises receiving and processing of the TV signal through, such as, internet method, and accordingly, it needs to integrate with a receiving device for internet TV signal, an audio-video conversion component and so on, and can independently receive/transmit, analysis and convert the CCTV signal data.

It needs to be noticed that any of the above mentioned sub units can independently receive, analysis and convert the TV signal data when mainly using different ways to transmit TV signal, then convert the raw TV data into a unprocessed data in a unified standard format to facilitate later processing of the core unit; meanwhile, each sub unit can be provided with components interacting data signal according to specific needs of user, so as to achieve the interacting with the TV signal in matching format (such as internet TV signal and so on). In addition, the above mentioned core and fabric module further comprises multiple auxiliary sub units, assembled with component able to individually complete a particular function or can be upgraded individually, as long as they can be individually replaced or upgraded.

Preferably, the above mentioned core and fabric module further connects to an external device which supplies TV signal, so as to receive the raw TV signal, and the TV signal is processed and transmitted to the display to play.

Preferably, the above mentioned main control block is also integrated with a power adapter used to drive the display panel, and the power adapter supplies power to the display panel through a connector, so as to realize the main module and the display panel, which are set individually, to share a same power source, to avoid the cost increasing caused by providing hardwares, relevant to the power adapter, on the main control block and the display separately, and at the same time, the thickness of display panel can be further reduced, which facilitates the operation and storage of TV set; of course, based on a power-sharing purpose, the display panel may be integrated with a power adapter configured to supply power to the main control block, to achieve the same goal of reducing costs and easy for storage.

Meanwhile, the above mentioned core unit (including main control chip etc.) can be used to process different TV signal data, and the certification, controlling and power feed of each sub unit device; as a core component of the TV set, the core unit can also be upgraded and replaced independently, i.e. the main control block is assembled by each of the above mentioned separate unit modules, which can be replaced or upgraded as a group, and at the same time, each unit can be upgraded or replaced as a single component, therefore users can buy a TV set according to their own requirements, with the method of assembling different sub units with the core unit, to form a core and fabric module that meets individual needs; and in the later using process, it can be replaced, upgraded or added with corresponding sub unit according to the changing demand at all time, so as to satisfy user need at different stage in real time.

It should be noticed that the above mentioned core and fabric module necessarily comprises a core unit and at least one sub unit; and with only a core unit and one sub unit, the core and fabric module can receive, analysis and convert TV signal, of which the format matches the format of the sub unit, and by adding any one or more sub unit(s) and/or auxiliary sub unit(s), so as to make the core and fabric module also have the corresponding function adapt to the added unit.

Preferably, the above mentioned core and fabric module can further comprise, for example, an audio-video input device for receiving audio-video data sent by external audio-video output device, and an internet access device for supplying internet communication signal (such as a wifi device supplying wireless communication signal and/or an Ethernet device supplying Internet communication signal et. al) and so on, so as to make the separate TV of this embodiment can be incorporated into the currently rapidly developing IOT (internet of things) in intelligent furniture.

Preferably, the above mentioned audio-video output device is mainly configured to receive and process the audio-video data, and transmit the processed audio-video data to the display panel for playing; meanwhile, the audio-video output device can also save the processed audio-video data to the local storage device, for data backup or call of use, et al; accordingly, the local storage device needs a large capacity, or through configuring a set storage algorithm, periodically clear the data prior to the preset period, so as to reserve enough storage space for saving the processed audio-video data.

In addition, the above mentioned audio-video conversion device further comprising a display panel, the display panel can communicate with the core and fabric module by the external connecting line or wireless communication; in this embodiment, the connection between the display panel and the main control block can be through the integrated bus, so as to receive and play the audio-video data transmitted from the core and fabric module by broadcasting, and the display panel can also feedback or transmit the corresponding control instrument to the core and fabric module so as to facilitate user to play the audio-video conversion device or operate human-computer interaction conveniently; meanwhile, the display panel is configured independently of the core and fabric module, so that it makes each of that can be upgraded and/or replaced independently, while the same display panel can still connect to one or more core and fabric modules simultaneously, and the same core and fabric module can connect to one or more displays simultaneously, so as to realize multi-screen display or multi-screen interaction function.

Preferably, the above mentioned display panel can comprises one or more selected from a group of a bridge chip, a display panel (such as LCD screen), an audio device (such as sound) and an external device (such as physical button and remote control signal receiving device and so on), to be integrated in the display panel, which is that the main control block can only integrate with a processing unit which process each function module, and the external device of each function module can be integrated in the display or configured independently, as long as the bridge chip is connected to the main control block, and the audio-video data processed by the main control chip can be received and processed, and send the audio data to the audio device for playing, meanwhile send the video data to the display panel for playing, and make playing of the display equipment and audio equipment playback progress synchronized; the above mentioned receiving/transmitting devices are mainly used for the control instruction sent by the controller adapting to the audio-video conversion device, and sending the control instruction to the main control chip, so as to make the main control chip controls the display panel and/or the video device according to the control instruction.

Preferably, when the above mentioned display panel is a touch screen, and the bridge chip can forward the touch instruction sent from the display panel to the core unit of the main control block, so as to realize the interactive operation between the user and the TV set.

Preferably, the user can adjust properties of the display panel through the physical button, such as contrast ratio and picture quality and so on.

Preferably, the above mentioned main control block further comprises a local storage device, the local storage device which is configured to save the audio-video data downloaded by the user and the parameter of TV playing and so on; meanwhile the display panel further comprises an audio/video input device (such as microphone, camera and so), the user can record the corresponding audio/video data by the audio/video input device, and save the data in the above mentioned local storage device and/or remote server, so as to save or share; meanwhile the audio-video conversion device can recall the saved or shared user's audio/video data to play. The following is detailed description of a procedure of a user from purchasing an audio-video conversion device to upgrading/replacing the audio and video conversion device:

At first, when a user buying a TV set, he can select an appropriate display according to his own requirements (such as size, picture quality, audio-visual effect etc.).

Secondly, the user can select the core unit matching the display panel according to the selected display panel, required sub unit and auxiliary sub unit device, so as to make the selected core unit and sub unit and auxiliary sub unit assemble into a main control block; for example, the user only require for a home digital TV set, then he can just select a core unit and a CCTV processing sub unit, and make the core unit and the CCTV processing sub unit assemble into a main control block, thus when a user can buy a TV set, he can select an appropriate sub unit hardware according to his specific requirement, which reduces user's purchase cost.

Thereafter, inserting the above mentioned main control block in a preset slot to connect, so as to form a TV set with function the user require, and after the TV set connected with the external device adapting the TV set, the TV signal can be broadcast as long as the TV set is powered on.

At last, in the process of later using, if user have a new requirement, he can just buy the main control block meet the requirement, and replace the new main control block t the display panel, so as to fulfill the requirement on the basis of the bought display of the audio-video conversion device; of course, the user can also remove the sub unit in the main control block of the bought audio-video conversion device according to requirement, and if user needs to replace, upgrade or repair, the user can upgrade repair or replace the a single sub unit, which greatly reduces the cost of upgrading and maintenance.

Meanwhile, due to each function module of the main control block is integrated separately, it improves the level of division cooperation of the manufacturer, and reduces the production costs of the product by independent mass production, so as to promote the rapid development of the whole industry; of course, based on the same conception, the display panel can also be configured in a similar structure.

Above all, in this embodiment, through configuring TV set and the main control block separately to efficiently reduce the difficulty of upgrading the TV set, each function module of the main control block is integrated as a whole at the same time, so as to make the main control block and/or any function module can be upgraded or replaced individually, which is that each different function module in TV set can be upgraded or replaced independently, so as to effectively solve the problem that component of TV set upgrade does not match, and reduce upgrade and maintenance costs, and the audio-video conversion device can share power which is benefit to reduce the size of the display and placing and processing of the TV set, and customized configuring assemble can be processed according to different users' individual needs, so as to effectively meet different users' individual needs.

Embodiment 2

Figure 2:
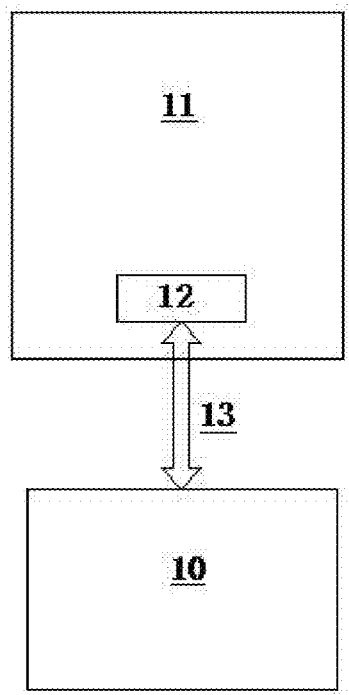
FIG. 2 is a structure diagram of the audio-video conversion system of embodiment 2 of this application.

The application further provides an audio-video system, which can based on the embodiment 1, referring to FIG. 2, the audio-video system comprises a control block 10 (equivalent to the main control block in the embodiment 1), and the display panel 11 (equivalent to the display in the embodiment 1), and a bridge interface 12 and a bridge chip (not shown) are inserted into the display panel 11. The above mentioned main control block (equivalent to the main control block in the embodiment 1) 10 can be configured independently of the display panel 11 in a modular piece way, and the main control block 10 has various form factors, and connect to the above mentioned bridge interface 12 through one or more connectors 13, so as to transmit the audio-video data to the bridge chip and control the display penal 11 to play.

Figure 3:
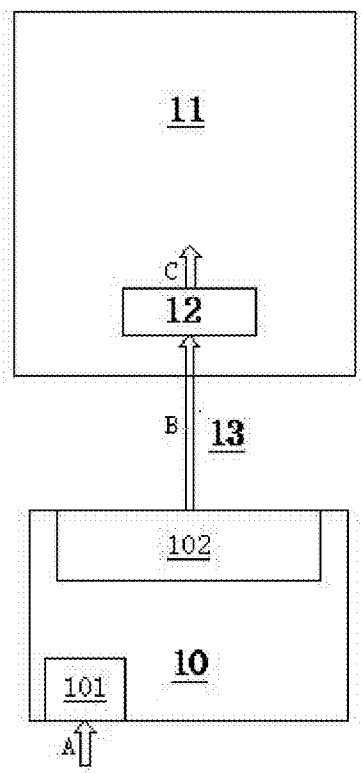
FIG. 3 is a structure diagram of the audio-video conversion in the audio-video system of embodiment 2 of this application.

Preferably, the above mentioned main control block 10 may comprise controls (not shown), relevant hardware 102 and inputs 101 and so on, if the controls 10 comprises video inputs and a video processing hardware; i.e., referring to FIG. 3, when the main control block 10 transmits video data to the bridge interface 12 through the connectors 13, and the bridge interface 12 transmits the received video data in Type B format to the bridge chip, so as to convert the video data format in Type B format to Type C format that displayable on the display panel 11, then the converted video data is displayed through the display panel 11. Specifically, the main control block 10 may comprise CPU (central processing unit), GPU (graphical processing unit), TV tuner, the power adapter for the control block and/or the display panel, HDMI (high-definition-multimedia-interface) inputs, the Wi-Fi module and other core and fabric modules of TV.

Figure 4:
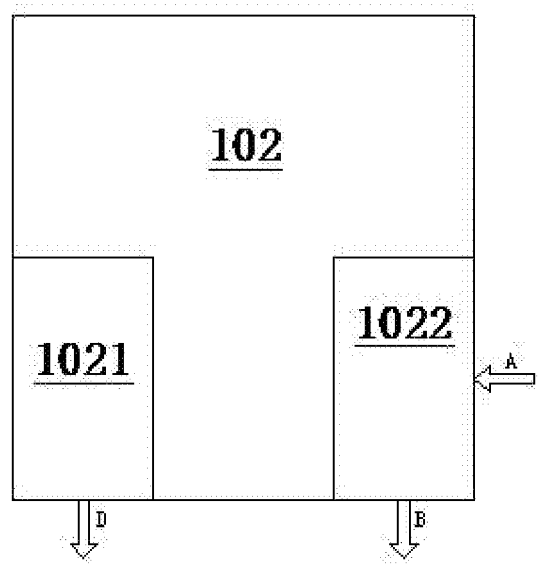
FIG. 4 is a structure diagram of the hardware device in the audio-video system of embodiment 2 of this application.

Preferably, based on FIGS. 1-3, referring to FIG. 4, the above mentioned video processing hardware 102 comprise a TV tuner 1022, mainly configured to process the TV signal A received by the main control block 10 which is to tune it to video data in Type B format, and output the processed TV signal to the bridge interface 12 through one or more of the connectors 13.

Preferably, the above mentioned main control block 10 can connect to the display panel 12 in various ways, for instance: the main control block 10 can be directly mounted on the display panel, or use one or more cables to realize connected a short distance away between the main control block 10 and the display panel 11, or realization of data exchange between the main control block 10 and display 11 via a wireless connection.

Preferably, the above mentioned bridge chip configured on the display panel 11 can adjust the parameter of the display panel 11 individually, so as to make the same display panel 11 can match the main control block 10 with different master mode, and it facilitates not only the follow-up upgrade processing, but also reduces the cost.

Nowadays, with the development of society and science, at the consumer electronic market, the core and fabric module of intelligent TV set based on SOC needs to upgrade every six months, but the developing of TV panel technology is relatively slow, thus the panel can not be upgraded with the core and fabric module synchronously, and due to TV set usually is a all-in-one machine, so it is hard to upgrade the core and fabric module individually. In order to make costumers enjoy the newest technology TV with the minimal cost, the applicant invent the above audio-video system, to make users just need to purchase or upgrade the main control block 10 having new function, which can realizes the upgrade of video function, hardware and other core and fabric module of TV, which is that the new or upgraded main control block 10 can create a TV having the newest TV technology with the old display panel 11, so as to allow users to spend a relatively low cost and enjoy the latest TV technology.

As an illustration of the embodiment, the above mentioned main control block 10 can be seen as a dongle or a plug adapter, which is that the main control block can be plugged in to the above mentioned display panel 11 through a plug-n-play connector or wire. For instance, for a Plug-Card TV (corresponding to the audio-video conversion device of embodiment 1) based on this embodiment, the Plug-Card TV may comprise a TV panel and a plug card, the plug card is socketed to the panel, and the TV set can work when powered on; when the Plug-Card TV being upgraded, the main control block can be upgraded or replaced by a new main control block having new function to complete the upgrade of the entire audio-video conversion device, and the display panel 11 is just a monitor, which does not need to upgrade or replace, so as to allow users to spend a relatively low cost and enjoy the latest TV Technology and promote the technology development of TV efficiently.

Wherein, for the above mentioned Plug-Card TV, the display panel is the main body of the TV set, which is that a slot is provided on the display panel, but the card is relatively small than the display panel; meanwhile the integrating process integrates with each core device into a integral main control block, and the main control block is provided with a plug matching the slot, then put the plug card into the slot through the plug to complete the assembly of the entire TV conveniently; accordingly, at this time the main control block can be configured with a power source sharing with the panel according to requirement.

Meanwhile, the above mentioned audio-video conversion device is based on the embodiment 1; when realizing customized assembling and upgrading each integrated unit individually, the display panel is seen as the main body of TV set, and the connection between the display and control module can be realized only through the socket, which is that the user can complete the upgrading and replacing of the main control block, so that while reducing the cost of upgrading and maintenance, the difficulty of the user upgrading is reduced.

In addition, as an illustration of another embodiment, the above mentioned main control block 10 may be a control box, and the control box is provided with an output port in, such as, HDMI or other format to make the main control block 10 connect to the input matching the format of the output on the display panel 11 through the output port, which is that the main control block 10 can use HDMI output to connect with the HDMI input of the display panel 11 through a HDMI cable, (accordingly, other types of lines can be used to achieve the communication and/or the electric connect between the main control block 10 and the display panel 11, which is that as long as the main control block 10 and the display panel 11 are connected, there is no influence on the technical scheme of this application no matter what specification or type lines it uses). For instance, for the audio-video conversion device based on the embodiment (such as BOX controlled TV based on the embodiment), the audio-video conversion device is configured with a plurality of modules which are independent to each other, such as control box and TV panel, and the TV panel, which are configured to each other by the customized cable, and each module can be upgraded separately, which makes it easier to upgrade or replace the sub system of the TV such as audio.

Wherein, based on FIGS. 1-3, referring to FIG. 4, the above mentioned hardware contained in the main control block 10 of the audio-video conversion device is further provided with a power adapter 1021, and the power adapter 1021 outputs electrical signal D powering the display panel through the above mentioned connector, which is that the main control block and the display panel share a same power source, so as to make the main control block and the display panel do not need to configure cable separately, therefore reducing the production costs of TV set, and save space occupied by TV set and make its structure simple, compact and beautiful.

Meanwhile, the above mentioned audio-video conversion device can also base on the embodiment 1, when individually upgrading the customized assembling and each integrated unit, the control box is the main body of TV structure, and the control box directly drive the display panel to work through the cable, so as to reduce the size of the display panel, while effectively reducing the size of the display, therefore make the audio-video conversion device lightweight and high performance.

It should be noticed that between the above mentioned audio-video conversion devices and the audio-video conversion device, the display panels thereof are basically the same, except that the layout of the PCB board are different, which can achieve the mutual-communication and mutual-use between each other through adaptively changing the package pins connected to the ports accordingly. Between the controls of the main control module and the control box, the same main chip can be used to support video decoder and multimedia functions.

Embodiment 3

Based on the embodiment 1 and/or embodiment 2, in order to improve the image quality and the flexibility between the display panel and the control block, the applicant further provides an audio-video port conversion device, which can be applied to the above audio-video conversion devices, the audio-video conversion device and the audio-video conversion devices and other TV systems, i.e., the audio-video port conversion device can be applied to the display panels of the embodiment 1 and the embodiment 2; but due to the different connection type between the main control block and the display of different TV sets, in the practical application, the audio-video port conversion device can be adaptively adjusted according to practical situation, but the main principle and the structure can be mutually applied.

The audio-video port conversion device in this embodiment may be a bridge IC, for instance a high-performance single-chip can be configured as the bridge IC, as long as HDMI format data is converted to LVDS and/or V-by-One format data; for instance, the bridge chip may be provided with an embedded 32 bit RISC processor for system control, and integrated with a embedded HDMI receiver and LVDS/V-by-One transmitter, which is that the bridge chip support HDMI 2.0 input, and convert the input data to LVDS/V-by-One format data to output; the above mentioned embedded HDMI receiver fully support the specification of HDMI 2.0, and can receive audio and video data through the input of the display.

Preferably, the HDMI 2.0 port in the above mentioned bridge chip all can be expanded, so as to make the bridge chip support resolution such as 4k×4K×8 bit 4:4:4 60 Hz or higher; thus, the above mentioned bridge chip can be more adaptable to the native resolution of the screed end (such as 4K×2K×10 bit 4:4:4 60 Hz or other resolution), so as to achieve the best image quality. Preferably, the above mentioned bridge chip further comprises a video processing unit and an audio processing unit, and the audio processing unit can not only perform advanced image correction and enhancement for the video data, but also convert the processed data to LVDS/V-by-One format for outputting.

Preferably, the above mentioned bridge unit can also be integrated with LVDS transmitter and V-by-One transmitter, and the above LVDS transmitter can send data of which the resolution is below 1080p@60 fps, and support LVDS output of single link and double link, and the V-by-One transmitter supports 4K/2K@60 fps resolution data output.

Preferably, the bridge chip in this embodiment is also integrated with many advanced peripherals, such as IR remote receiver, 2-channel ADC device, 12C device, UART device, SPI device and PWM interface and so on.

In addition, the above mentioned bridge chip is also integrated with an on-chip oscillator and 64 KB SRAM, so as to reduce system complexity and BOM cost.

In this embodiment, because the bridge chip has a high performance and a high function-price ratio, and it has the capability of converting the received HDMI data into LVDS/V-by-One format data, it can be applied to HD TV, FHD TV and UHD TV and other devices.

Figure 5:
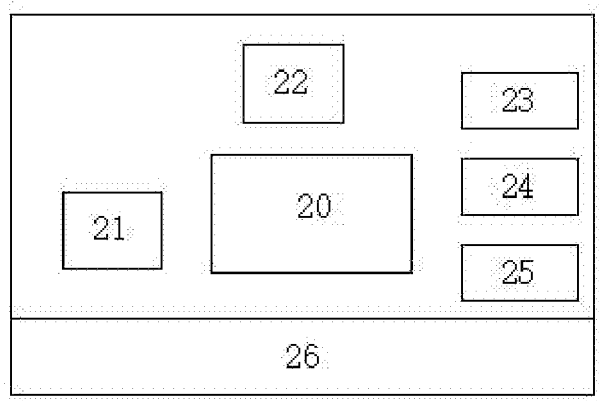
FIG. 5 is a structure diagram of bridge chip in the audio-video port conversion device of embodiment 3 of this application.

FIG. 5 is a structure diagram of the bridge chip in the audio-video port conversion device of embodiment 3; as shown in FIG. 5, the bridge chip comprises a core and fabric module 20, an audio/video input unit 21, a video output unit 22, an audio output unit 23, a memory interface 24, a system interface 25 and an input/output unit 26.

Further, the core and fabric module (equivalent to the core block in embodiment 1) 20 may comprises multiple subsystem such as embedded 32 bit RISC CPU and so on, and also it may comprise video processing unit and an independent storage unit for storing data (such as 64 KB SRAM) and ICCM, DCCM and other units, and the core and fabric module 20 also support rapid calculation operated by MAC and extended arithmetic package and so on.

Preferably, the video processing unit has a pattern generator, OSD, DNLP, white balance, Gamma, Hue saturation adjust and bright contrast and other function modules, and the pattern generator can generate like red, green, blue, white, black, and all kinds of standard gray shade.

Preferably, the audio-video input unit 21 has an embedded HDMI 2.0 Rx port, configured to receive TV signal in HDMI format, and the audio-video input unit 21 may support resolutions like 1080P@60 Hz, 1080P@120 Hz, 1080P@50 Hz, 1080P@100 Hz, 1366*768@50 Hz, 1366*768@60 Hz, 4K*2K@60 Hz and so on; accordingly, the video output module 22 has a LVDS port and V-by-One port, and the LVDS port may has 1 or 2 channels, and support resolution of 1080p@60 Hz, 1080P@120 Hz, 1080P@50 Hz, 1080P@100 Hz, 1366*768@50 Hz, 1366*768@60 Hz and so on, and V-by-One port support 1080P@60 Hz, 1080P@120 Hz, 1080P@50 Hz, 1080P@100 Hz, 1366*768@50 Hz, 1366*768@60 Hz or 4K*2K@60 Hz an so on.

Preferably, the above mentioned audio output module 23 may have a 12S port of 2 channels, and the storage port 24 has a SPR NOR and a flash controller, and can support 1, 2 or 4 bit flash through the SPI port; the input/output port 26 has an IR remote receiving subport, two embedded SA RADC subports, two 12C subports, three UART subports, an SPI subport, four PWM subports and a group of common I/O interfaces and so on. Wherein, the above mentioned four PWM subports, and one PWM subports are used for LED output, the remaining three PWM subports are used for video output.

Further, the above mentioned bridge chip is intergrated with a common counter, a timer, a build-in oscillator and an input port of 24 MHz crystal oscillator and other external devices, and the bridge chip further comprises two internal power management modules which can be controlled by software and so on.

Preferably, the audio-video port conversion device in this embodiment may comprises pins of 13*13 specification, configured to connect the port, and the functions of each pins all can be adaptively adjusted in accordance with existing standard based on the practical demand, and part of the pins may be set as pins with multiple functions, so as to make it adapt to TV set with different assembly methods.

In conclusion, in this embodiment, through converting the LVDS and/or V-by-One input in the display panel into the HDMI port to make the display can match the widely used HDMI audio-video processing device, then improve the flexibility of its adaptation; meanwhile, because the audio-video conversion device directly convert the TV signal in HDMI format into TV signal in LVDS and/or V-by-One format and send it to the play device for playing, therefore there is no need to provide traditional LVDS chip and/or V-by-One chip on the display panel, and supports relatively high frequency to match the frequency division and the frequency conversion of the screen end, and then achieve the best image quality.

The foregoing is only the preferred embodiments of the invention, not thus limiting embodiments and scope of the invention, those skilled in the art should be able to realize that the schemes obtained from the content of specification and figures of the invention are within the scope of the invention.

What is claimed is:

1. An audio-video conversion device, applied to a TV (television) set in which a main control block and a display panel are set separately, the main control block can be plugged in to the display panel through a plug-n-play connector, the main control block and the display panel shares a same power source;
comprising:
an audio-video input unit, configured to receive a TV signal in HDMI (High Definition Multimedia Interface) format, the audio-video input unit comprises an embedded HDMI receiver;
a core and fabric module, connected to the audio-video input unit to receive the TV signal and convert format of the TV signal into LVDS (Low Voltage Differential Signaling) format and V-by-One format, the core and fabric module comprises a processor and a converter, and the processor control the converter to receive and convert format of the TV signal into LVDS format and/or V-by-One format outputting;
the TV signal comprises audio signal and video signal, and the core and fabric module comprises: a video processing unit, configured to receive the video signal in the TV signal in HDMI format, and performing advanced image correction and enhancement for the video signal, converting the signal into a video signal in LVDS format and/or V-by-One format for outputting, and an audio processing unit, configured to receive the audio signal in the TV signal in HDMI format, and convert the audio signal, so as to match the audio signal after conversion of the output video signal in LVDS format and/or V-by-One format;
and
an audio-video output unit, connected to the core and fabric module and a playing device of the TV set respectively, configured to receive and send the TV signal in LVDS format and/or the V-by-One format to the playing device for playing, the audio-video output unit
comprises LVDS emitter, configured to send the TV signal in LVDS format, and a V-by-One emitter, configured to send the TV signal in V-by-One format.

2. The audio-video conversion device claimed in claim 1, wherein the video processing unit comprises an image producer, an OSD (On Screen Display) functional unit, a DNLP functional unit, a white balance functional unit, a hue-saturation adjustment functional unit and a brightness adjustment functional unit.

3. The audio-video conversion device claimed in claim 1, further comprising: a storage unit, connected to the core and fabric module through a set system interface to keep the core and fabric module operating.

4. The audio-video conversion device claimed in claim 1, further comprising: a remote IR (Infrared) receiver, connected to the core and fabric module to receive a control instruction sent by a controller of the TV set; an on-chip oscillator, connected to the core and fabric module to provide clock signal to the core and fabric module.

5. The audio-video conversion device claimed in claim 1, further comprising: an input/output port, connected to the audio-video input unit and the audio-video output unit respectively, and configured to receive the TV signal in HDMI format, and output the TV signal in LVDS format and/or the V-by-One format to the playing device for playing.

6. The audio-video conversion device claimed in claim 1, wherein the playing device comprises a sound and a display panel.

7. The audio-video conversion device claimed in claim 1, wherein the input/output port comprises a remote IR receiving sub port, an embedded SAR ADC (Successive Approximation Analog-to-Digital Converter) sub port, a I$^2$C (Inter-Integrated Circuit) sub port, a UART (Universal Asynchronous Receiver/Transmitter) sub port, a PWM (Pulse Width Modulation) sub port and a group of universal I/O interfaces.

* * * * *